United States Patent [19]

Choi

[11] Patent Number: 5,610,891
[45] Date of Patent: Mar. 11, 1997

[54] MINIDISC PLAYER HAVING IMPROVED SHUTTER ACTUATING MECHANISM OF DISC CARTRIDGE

[75] Inventor: Youngsuk Choi, Seoul, Rep. of Korea

[73] Assignee: Daewoo Electronics Co., Ltd., Seoul, Rep. of Korea

[21] Appl. No.: 360,059

[22] Filed: Dec. 20, 1994

[30] Foreign Application Priority Data

Dec. 24, 1993 [KR] Rep. of Korea ............... 93-29438

[51] Int. Cl.⁶ .................................................. G11B 33/02
[52] U.S. Cl. .......................... 369/77.2; 369/75.1; 369/79
[58] Field of Search .................. 369/75.1, 77.2, 369/79, 291; 360/96.6, 99.02, 99.06

[56] References Cited

U.S. PATENT DOCUMENTS

| | | | |
|---|---|---|---|
| 3,593,327 | 7/1971 | Shill | 360/99.06 |
| 4,493,069 | 1/1985 | Insley et al. | 369/75.1 |
| 5,068,758 | 11/1991 | Choi | 360/96.6 |
| 5,331,627 | 7/1994 | Childers et al. | 369/291 |

Primary Examiner—Stuart S. Levy
Assistant Examiner—William J. Klimowicz
Attorney, Agent, or Firm—Oliff & Berridge

[57] ABSTRACT

Disclosed is a minidisc player of a top loading type including a shutter actuating mechanism which has a guiding groove formed linearly along an upper surface of one side of a housing of which both side edges are provided with a cover. Also, the shutter actuating mechanism which is received in the guiding groove is connected to the cover and can be moved along the guiding groove responsive to the opening and closing operations of the housing cover. The shutter actuating mechanism effects the opening and closing of a minidisc cartridge shutter upon the pivotal movement of the housing cover.

5 Claims, 3 Drawing Sheets

MINIDISC PLAYER HAVING IMPROVED SHUTTER ACTUATING MECHANISM OF DISC CARTRIDGE

BACKGROUND OF THE INVENTION

1. Field of the Invention

The present invention relates to a minidisc player and more particularly, to a minidisc player of a top loading type having a disc cartridge shutter actuating mechanism with a simple structure to actuate a shutter of a cartridge responsive to the opening and closing operations of a housing cover thereof.

2. Description of the Prior Arts

In general, minidiscs accommodated in cartridges are a disc-shaped recording medium which is a little smaller than a compact disc, e.g., magnetic or optical one. A minidisc player loads this cartridge, so that this player can reproduce information recorded on the minidisc accommodated therein. Such cartridge has a window for allowing the recording medium accommodated therein to make contact with a head of the minidisc player and also a shutter to open and close the window.

When the minidisc cartridge is inserted into the player for operation, the shutter is opened to expose the window in order that the minidisc accommodated therein makes contact with the head of the minidisc player. On the contrary, when the minidisc cartridge is ejected out of the player, the shutter provided on the disc cartridge is closed thereby to close the window.

The minidisc player of a top loading type is so constructed that a housing cover thereof is opened and closed upward and downward at a predetermined angle against a housing thereof and the minidisc can be mounted downward on a turntable provided on a base plate placed within the housing.

In this conventional player, a disc tray should be provided on the player in order to open the shutter of the disc cartridge when the disc cartridge is mounted on the turntable. Thus, a loading mechanism of the minidisc player is very complicatedly constructed and further bulky in size, so that it is difficult to provide a minidisc player with small and compact construction. Also, some inconvenience for an operation of mounting the minidisc thereon may be caused due to small opening angle of a housing cover.

A mechanism for actuating the cartridge shutter receiving the minidisc is disclosed in U.S. Pat. No. 4,994,930 (issued to Keiji Uehara) for which an operation will be described in the following.

When loading the disc cartridge on the disc player, a shutter depression is engaged with a pin of an actuation arm constituting a loading mechanism of the disc player. With this engagement, the disc cartridge continues to proceed to the turntable, so that the shutter of the cartridge is opened. On the contrary, this cartridge is ejected out of the turntable, so that the shutter is closed. However, the actuation arm has to have a predetermined length and be moved at a certain angle, so that a little more space may be required within the disc player. Thus, it is difficult to provide a minidisc player with small and compact construction.

SUMMARY OF THE INVENTION

The present invention is intended to overcome the above-mentioned and numerous other disadvantages and deficiencies of the prior art. Therefore, it is an object of the present invention to provide a minidisc player of a top loading type which can be made simple and small in structure.

To achieve the above-described object of the present invention, the minidisc player of a top loading type comprises;

a housing for receiving a minidisc cartridge, the housing having a guiding groove formed longitudinally along one side thereof;

a housing cover rotatably hinged on both side edges of the housing; and a shutter actuating mechanism inserted in the guiding groove and connected to the housing cover, the shutter actuating mechanism to be movable along the guiding groove responsive to the opening and the closing of the cover.

The guiding groove is preferably formed in parallel to the lengthwise direction of the housing. The front portion of the guiding groove is directed to the inside of the housing and the rear portion of the guiding groove is directed to the outside of the housing. The front and rear portions of the guiding groove communicate with each other to form a path having a curved portion.

The shutter actuating mechanism includes a body which has the same depth as that of the guiding groove and a shutter actuating piece which is extended along the lengthwise direction of the housing.

When opening the housing cover of the player, the cartridge is mounted on the housing. The shutter actuating mechanism is connected to the housing and linearly moved backwards and forwards along the guiding groove formed in the housing. When this mechanism starts to be moved responsive to the closing of the cover, the shutter actuating piece is engaged with the depression of the cartridge. At that time, after completely covering the cover, the shutter of the cartridge mounted on the housing can be completely opened.

BRIEF DESCRIPTION OF THE DRAWINGS

The present invention may be better understood and its numerous objects and advantages will be more apparent to those skilled in the art by reference to the accompanying drawings in which.

DESCRIPTION OF THE PREFERRED EMBODIMENT

Hereinafter, the present invention will be explained in detail with reference to the accompanying drawings.

Figure 1:
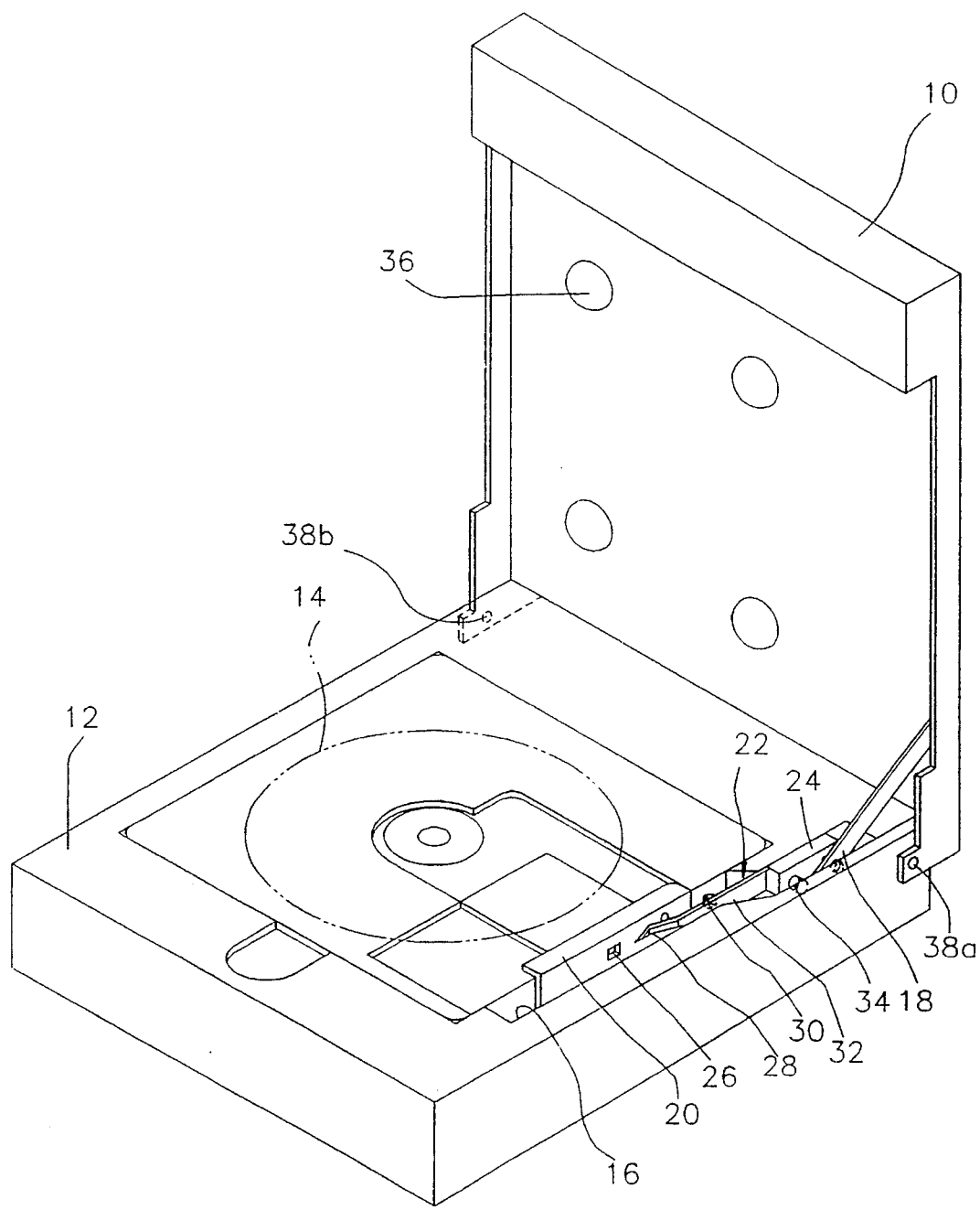
FIG. 1 is a perspective view for showing an opening state of a housing cover of a minidisc player according to one embodiment of the present invention.

FIG. 1 is a perspective view for showing an opening state of a housing cover of a minidisc player of the present invention.

As shown in FIG. 1, the minidisc player of the present invention includes a housing 12, a housing cover 10, a guiding groove 16 and a shutter actuating mechanism 22. Housing 12 can receive a minidisc cartridge 14 therein. Housing cover 10 is hinged on both side edges of housing 12. Guiding groove 16 has a predetermined length and is formed on the upper surface of housing 12 at its one side along its lengthwise direction. A shutter actuating mechanism 22 which is inserted in guiding groove 16 is connected to an inner surface of a rear end of housing cover 10 by a link 18. The opening or closing operation of cover 10 causes shutter actuating mechanism 22 to move backwards and forwards along guiding groove 16, so that it can open and close a shutter 20 of minidisc cartridge 14 of the minidisc mounted on housing 12.

Shutter actuating mechanism 22 has a hexahedral body 24 which has the same depth as that of guiding groove 16. Body 24 has a shutter actuating piece 32 which is attached to its inward surface and extended along a lengthwise direction of housing 12. A front end of shutter actuating piece 32 has a bent portion 28 which is bent in the shutter direction, so that it can be engaged with a depression 26 formed on shutter 20 of minidisc carriage 14. A support projection 30 is attached to a middle position of shutter actuating piece 32 and is directed to disc cartridge 14.

A rear portion of an outer surface of body 24 is connected to one end of link 18. An elastic member 34 is placed on the front portion of the outer surface of body 24 to which one end of link 18 is attached. Elastic member 34 presses body 24 toward disc cartridge 14.

Guiding groove 16 is preferably formed in parallel to the lengthwise direction of housing 12. The front portion of guiding groove 16 is directed to inside of the housing 12 and the back portion of guiding groove 16 is directed to outside of the housing 12. The front and back portions of guiding groove 16 communicate with each other to form a path having a curved portion, so that, when shutter actuating mechanism 22 is moved backwards and forwards, shutter actuating mechanism 22 shifts to its course at a given position from the inward direction of housing 12 toward the outward direction of housing 12. When cover 10 is opened, shutter actuating mechanism 22 is moved to the outward direction through the curved portion of guiding groove 16.

Figure 3A:
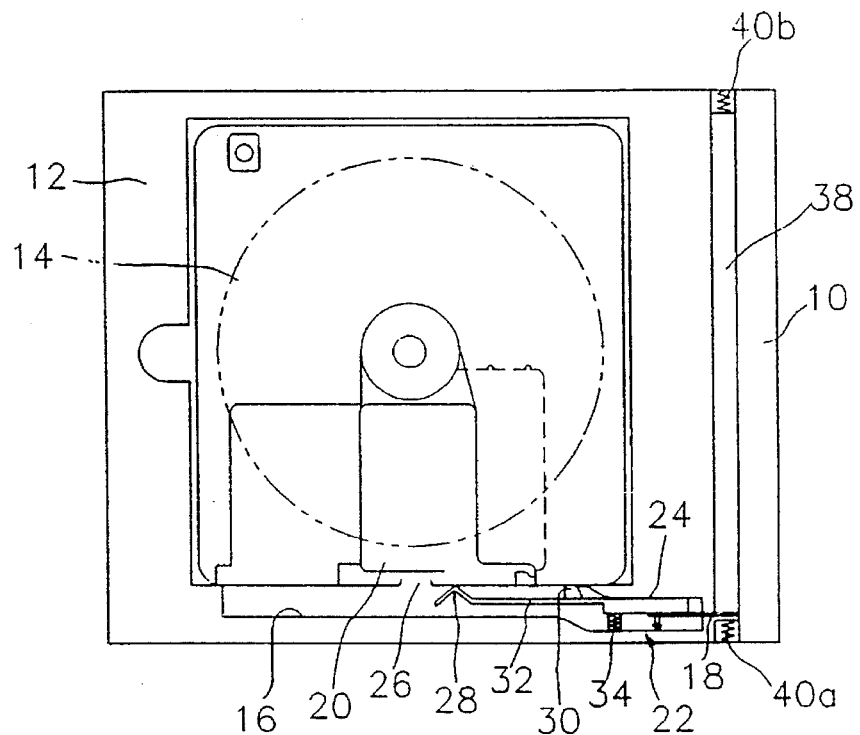
FIG. 3A is a plan view for showing a mounting state of a disc cartridge on a minidisc player as shown in FIG. 1.

Cover 10 is connected to both side edges of housing 12 by hinges 38a and 38b. Torsion springs 40a and 40b as shown in FIGS. 1 and 3A are inserted in both axes of hinges 38a and 38b respectively, so that the opening angle of cover 10 against housing 12 preferably becomes 90°. Pressing projections 36 tightly press the top surface of disc cartridge 14 when completely closing cover 10.

Figure 2:
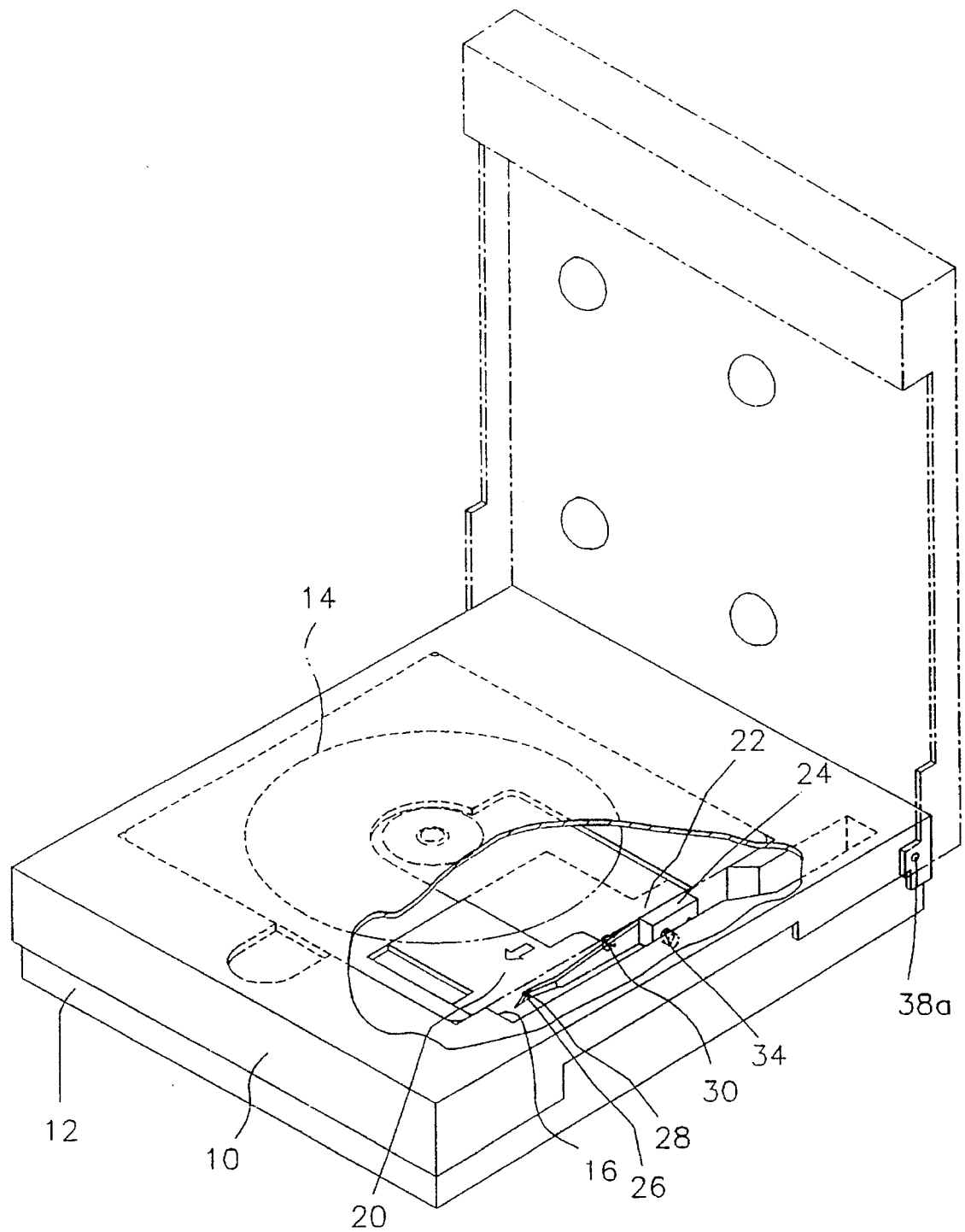
FIG. 2 is a perspective view for showing a closing state of a housing cover of a minidisc player as shown in FIG. 1.
Figure 3B:
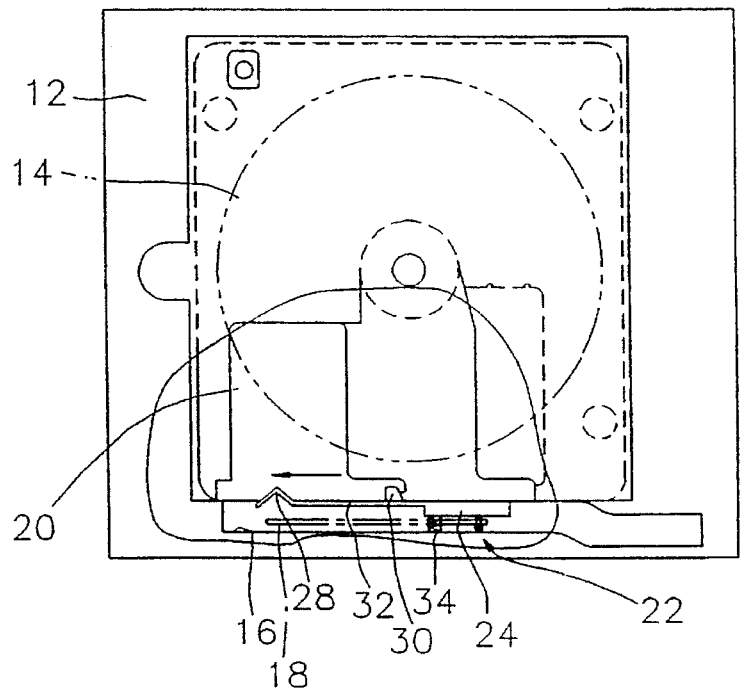
FIG. 3B is a plan view for showing an opening state of a shutter of a cartridge as shown in FIG. 1.

With reference to FIGS. 2, 3A and 3B, an operation of the shutter actuating mechanism of FIG. 1 will be described.

To exchange disc cartridge 14, upon completion of opening cover 10, cover 10 is opened perpendicularly to housing 12 by an operation of torsion springs 40a and 40b inserted in both of the axes of hinges 38a and 38b respectively, FIG. 3A shows a moving position of shutter actuating mechanism 22 according to the complete opening of cover 10. Shutter actuating mechanism 22 is connected to cover 10 by link 18, so that when cover 10 is opened, shutter actuating mechanism 22 is moved backward along guiding groove 16 having the curved boundary surface together with depression 26 of shutter 20 with which bent portion 28 is engaged. Due to the pressing operation of elastic member 34 provided on body 24 of shutter actuating mechanism 22, shutter actuating mechanism 22 can be moved backward with safety to completely close shutter 20. When cover 10 is completely opened, that is, cover 10 stands perpendicularly to housing 12, bent portion 28 is relieved from depression 26 of shutter 20. The length of shutter actuating piece 32 can be preferably adjusted in order that, when cover 10 is completely opened, bent portion 28 can be relieved from depression 32.

Upon completion of pulling out bent portion 28 from depression 26, disc cartridge can be manually ejected outward.

Next, when disc cartridge 14 is mounted on the minidisc player, an operation of shutter actuating mechanism 22 of the present invention will be described.

FIG. 3B is a plan view for showing an opening state of shutter 20 by the mounting of the disc cartridge thereon.

As shown in FIG. 3A, when cover 10 starts to be closed after mounting disc cartridge 14, since shutter actuating mechanism 22 is connected to link 18, shutter actuating mechanism 22 is moved in the front direction where depression 26 of shutter 20 is positioned along guiding groove 16 having the curved boundary surface. Along the forward moving direction of shutter actuating mechanism 22, bent portion 28 is engaged with depression 26 of shutter 20. With this engagement, shutter actuating mechanism 22 continues to proceed until cover 10 is completely closed, so that shutter 20 is completely opened at the same time as housing 12 is closed. When shutter actuating mechanism 22 is moved, elastic member 34 provided on the front portion of the outer surface of body 24 presses shutter actuating mechanism 22 toward the inside of guiding groove 16, so that the opening operation of shutter actuating piece 32 can be safely performed. When shutter 20 is opened, support projection 30 provided on the middle position of shutter actuating piece 32 supports the inside end of shutter 20, so that shutter 20 is prevented from being freely closed. Support projection 30 also releases a locking lever(not shown) disposed in cartridge 14 when shutter actuating mechanism 22 is moved in the front direction.

Thus, if the shutter actuating mechanism of the present invention is applicable to the minidisc player, a miniaturization of the player can be achieved as well as the production cost can be reduced due to the simple construction of this mechanism.

It is understood that various other modifications will be apparent to and can be readily made by those skilled in the art without departing from the scope and spirit of this invention. Accordingly, it is not intended that the scope of the claims appended thereto be limited to the description as set forth herein, but rather that the claims be constructed as encompassing all the features of the patentable novelty that reside in the present invention, including all the features that would be treated as equivalents thereof by those skilled in the art to which this pertains.

What is claimed is:

1. A minidisc player of a top loading type, comprising:

a housing for receiving a minidisc cartridge with a shutter, said housing having a guiding groove formed longitudinally along one side therein, wherein said guiding groove has a front portion directed inwards in said housing and a rear portion directed outwards in said housing and said front and rear portions communicate with each other to form a path having a curved portion;

a housing cover rotatably hinged on both side hinges of said housing and for opening and closing said housing; and a shutter actuating mechanism placed in said guiding groove and connected to said housing cover, said shutter actuating mechanism to be movable along said guiding groove responsive to the opening and the closing of said cover so as to open and close the shutter of the minidisc cartridge, said shutter actuating mechanism has:

a body having a same depth as that of said guiding groove and connected to said housing cover;

a shutter actuating piece extended along a lengthwise direction of said guiding groove, one end of said shutter actuating piece being connected to said body; and an elastic member on a front portion of an outer surface of said body facing the housing outwardly, wherein said elastic member is contacted against said guiding groove so as to press said shutter actuating mechanism toward said shutter.

2. The minidisc player as claimed in claim 1, wherein said shutter actuating piece has a bent portion being engaged with a depression of said shutter and a support projection formed towards said minidisc cartridge.

3. The minidisc player as claimed in claim 1, wherein said housing cover has a plurality of pressing projections on an inner surface facing said housing.

4. The minidisc player as claimed in claim 1, wherein connecting said shutter actuating mechanism to said housing cover is carried out by a link.

5. The minidisc player as claimed in claim 1, wherein said body is shaped in a hexahedral fashion.

* * * * *